US012798484B2

(12) United States Patent
Kodama

(10) Patent No.: US 12,798,484 B2
(45) Date of Patent: Nov. 17, 2026

(54) IMAGE DISPLAY DEVICE AND IMAGE DISPLAY METHOD

(71) Applicant: TOYOTA JIDOSHA KABUSHIKI KAISHA, Toyota (JP)

(72) Inventor: Shinya Kodama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/060,238

(22) Filed: Feb. 21, 2025

(65) Prior Publication Data

US 2025/0319819 A1 Oct. 16, 2025

(30) Foreign Application Priority Data

Apr. 10, 2024 (JP) ................................ 2024-063412

(51) Int. Cl.
*B60R 1/00* (2022.01)
*B60R 1/27* (2022.01)

(52) U.S. Cl.
CPC .......... *B60R 1/27* (2022.01); *B60R 2300/305* (2013.01); *B60R 2300/306* (2013.01); *B60R 2300/607* (2013.01); *B60R 2300/806* (2013.01)

(58) Field of Classification Search
CPC ................ B60R 1/27; B60R 2300/305; B60R 2300/306; B60R 2300/607; B60R 2300/806; B60R 1/28; B60R 2300/70; B60R 2300/80; B60R 2300/105; B60R 2300/303; B60R 2300/60; B60R 2300/102; B60R 2300/602; B60K 35/29; B60K 35/81; B60K 2360/176; H04N 5/2628; H04N 5/265; H04N 23/57; H04N 23/90; B60Y 2400/301
See application file for complete search history.

(56) References Cited

U.S. PATENT DOCUMENTS

| | | | | |
|---|---|---|---|---|
| 7,506,011 | B2 * | 3/2009 | Liu | G06F 16/273 |
| 8,305,899 | B2 * | 11/2012 | Luo | H04W 8/04 370/428 |
| 11,669,230 | B2 | 6/2023 | Yamamoto et al. | |
| 2006/0187304 | A1 | 8/2006 | Sakata | |
| 2012/0237461 | A1 * | 9/2012 | Yu | A61K 8/25 424/59 |

(Continued)

FOREIGN PATENT DOCUMENTS

| | | |
|---|---|---|
| JP | 2006-224873 A | 8/2006 |
| JP | 2012-051391 A | 3/2012 |
| KR | 10-2020-0139312 A | 12/2020 |

*Primary Examiner* — Frank F Huang
(74) *Attorney, Agent, or Firm* — Oliff PLC

(57) ABSTRACT

An image display device includes a camera configured to image a periphery of a vehicle, a controller configured to output an overhead image in which the vehicle is viewed from a viewpoint above the vehicle, the overhead image being obtained by synthesizing images captured by the camera, a display unit configured to display the overhead image output by the controller, and a sensor configured to detect an opened state of a door of the vehicle. The controller is configured to enlarge the overhead image and display the overhead image on the display unit, and cancel the enlargement of the overhead image in response to the detection of the opened state of the door of the vehicle by the sensor.

2 Claims, 7 Drawing Sheets

(56) References Cited

U.S. PATENT DOCUMENTS

| | | | | |
|---|---|---|---|---|
| 2012/0251600 | A1* | 10/2012 | Yu | A61K 8/29 424/78.03 |
| 2014/0004073 | A1* | 1/2014 | Yu | A61Q 19/08 424/78.03 |
| 2015/0323525 | A1* | 11/2015 | Vidarsson | G01N 33/54373 506/9 |
| 2017/0100032 | A1* | 4/2017 | Zakariaie | A61B 3/0025 |
| 2017/0150133 | A1* | 5/2017 | Yoshida | H04N 13/393 |
| 2019/0100144 | A1 | 4/2019 | Asayama et al. | |
| 2020/0081607 | A1 | 3/2020 | Yamamoto et al. | |
| 2021/0188177 | A1 | 6/2021 | Egashira et al. | |
| 2021/0206508 | A1* | 7/2021 | Cabos | G06V 20/52 |
| 2022/0063834 | A1* | 3/2022 | Cabos | G06V 10/70 |
| 2022/0204314 | A1* | 6/2022 | Farberov | B66B 1/3492 |
| 2023/0039908 | A1* | 2/2023 | Patel | G01B 11/2513 |
| 2023/0143690 | A1 | 5/2023 | Shioguchi et al. | |
| 2023/0294668 | A1* | 9/2023 | Minase | B60R 1/26 701/41 |
| 2025/0153648 | A1* | 5/2025 | Diamond | G06V 20/64 |
| 2025/0319819 | A1* | 10/2025 | Kodama | B60R 1/27 |

* cited by examiner

IMAGE DISPLAY DEVICE AND IMAGE DISPLAY METHOD

CROSS-REFERENCE TO RELATED APPLICATION

This application claims priority to Japanese Patent Application No. 2024-063412 filed on Apr. 10, 2024. The disclosure of the above-identified application, including the specification, drawings, and claims, is incorporated by reference herein in its entirety.

BACKGROUND

1. Technical Field

The present disclosure relates to an image display device and an image display method.

2. Description of Related Art

Japanese Unexamined Patent Application Publication No. 2012-51391 (JP 2012-51391 A) discloses an image display device for a vehicle. The device converts image signals of a plurality of cameras that image surroundings of a vehicle into image signals when the surroundings of the vehicle are viewed from a viewpoint above the vehicle, and synthesizes the converted image signals. As a result, the overhead image viewed from the viewpoint above the vehicle is displayed. The device stores, in advance, a trajectory of a door when the door of the vehicle is opened and closed, and depicts and displays the stored trajectory of the door in an overhead image while the vehicle is stopped. As a result, an occupant can confirm whether or not an area in which the occupant can open the door of the vehicle to get off the vehicle is present between the vehicle and an adjacent parked vehicle.

SUMMARY

Meanwhile, in the device disclosed in JP 2012-51391 A, it is conceivable that a current opened state of the door is reflected in the overhead image for issuing an alert to the occupant. In addition, it is conceivable to add a function of enlarging and displaying the overhead image in order to improve convenience for the occupant. However, in a case where the overhead image is enlarged and displayed, there is a concern that the opened state of the door reflected for the alert is present outside a screen and is not be displayed. The present disclosure provides an image display device and an image display method that appropriately achieve both convenience of image enlargement and an alert for a door-opened state when an overhead image of a vehicle is displayed.

A first aspect of the present disclosure relates to an image display device including a camera, a controller, a display unit, and a sensor. The camera is configured to image a periphery of the vehicle. The controller is configured to output an overhead image in which the vehicle is viewed from a viewpoint above the vehicle, the overhead image being obtained by synthesizing images captured by the camera. The display unit is configured to display the overhead image output by the controller. The sensor is configured to detect an opened state of a door of the vehicle. The controller is configured to enlarge the overhead image and display the overhead image on the display unit. The controller is configured to cancel the enlargement of the overhead image in response to the detection of the opened state of the door of the vehicle by the sensor.

In the image display device, the images captured by the camera configured to capture the periphery of the vehicle are synthesized, and the overhead image is displayed on the display unit. The overhead image is enlarged and displayed on the display unit. The enlargement of the overhead image is canceled in response to the detection of the opened state of the door of the vehicle by the sensor. By canceling an enlarged state, the overhead image in which the entire vehicle is viewed is displayed on the display unit, and thus the image display device can issue an alert with the door in the opened state on the overhead image. As described above, the image display device can appropriately achieve both the convenience of the image enlargement and the alert for the door-opened state by allowing enlargement display to be performed and canceling the enlargement display when the door is in the opened state.

In the image display device according to the first aspect of the present disclosure, the controller may be configured to determine whether or not all the doors of which the opened states are detected by the sensor are within the overhead image in an enlarged state displayed on the display unit. The controller may be configured to not cancel the enlargement of the overhead image in response to the determination that all the doors in the opened states are within the overhead image. In a case where all the doors in the opened states are within the overhead image, the enlargement of the overhead image is maintained, and thus unnecessary cancellation of the enlargement of the overhead image is avoided. Therefore, the image display device can more appropriately achieve both the convenience of the image enlargement and the alert for the door-opened state.

A second aspect of the present disclosure relates to an image display method including synthesizing images captured by a camera configured to image a periphery of a vehicle to generate an overhead image in which the vehicle is viewed from a viewpoint above the vehicle. The image display method includes enlarging the generated overhead image and displaying the overhead image on a display unit, detecting an opened state of a door of the vehicle, and canceling the enlargement of the overhead image in response to the detection of the opened state of the door of the vehicle. The image display method achieves the same effects as the image display device described above.

According to the present disclosure, it is possible to provide a technique with which both convenience of image enlargement and an alert for a door-opened state can be appropriately achieved when an overhead image of a vehicle is displayed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings.

Configuration of Vehicle

Figure 1:
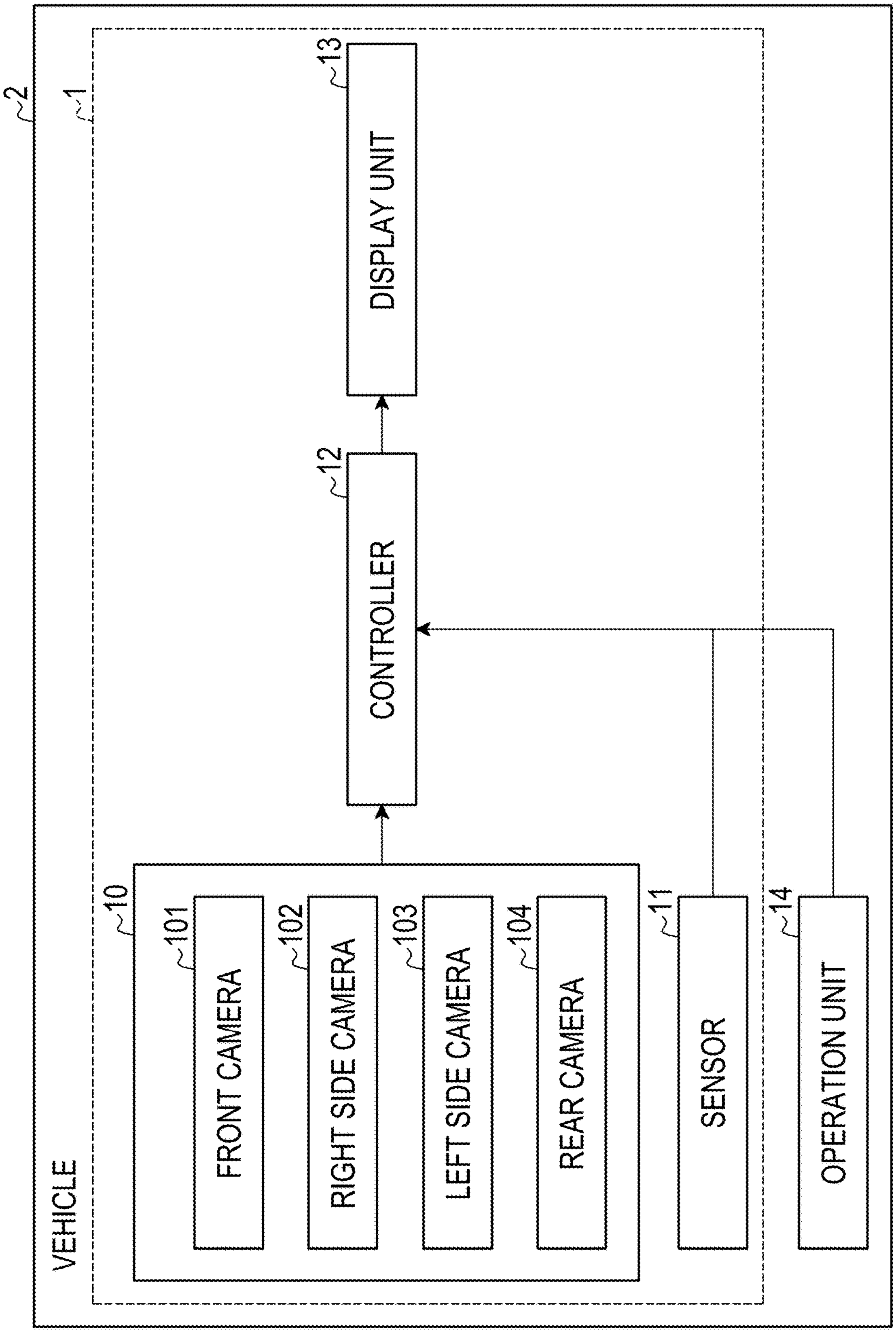
FIG. 1 is a block diagram showing an example of a configuration of a vehicle provided with an image display device according to an embodiment.

FIG. 1 is a block diagram showing an example of a configuration of a vehicle provided with an image display device according to an embodiment. As shown in FIG. 1, an image display device 1 is mounted on a vehicle 2 as an example. The vehicle 2 may be a vehicle driven by a driver or may be an autonomous vehicle.

The vehicle 2 includes a plurality of cameras 10, a sensor 11, a controller 12, a display unit 13, and an operation unit 14. The image display device 1 is configured to include the cameras 10, the sensor 11, the controller 12, and the display unit 13.

Figure 2:
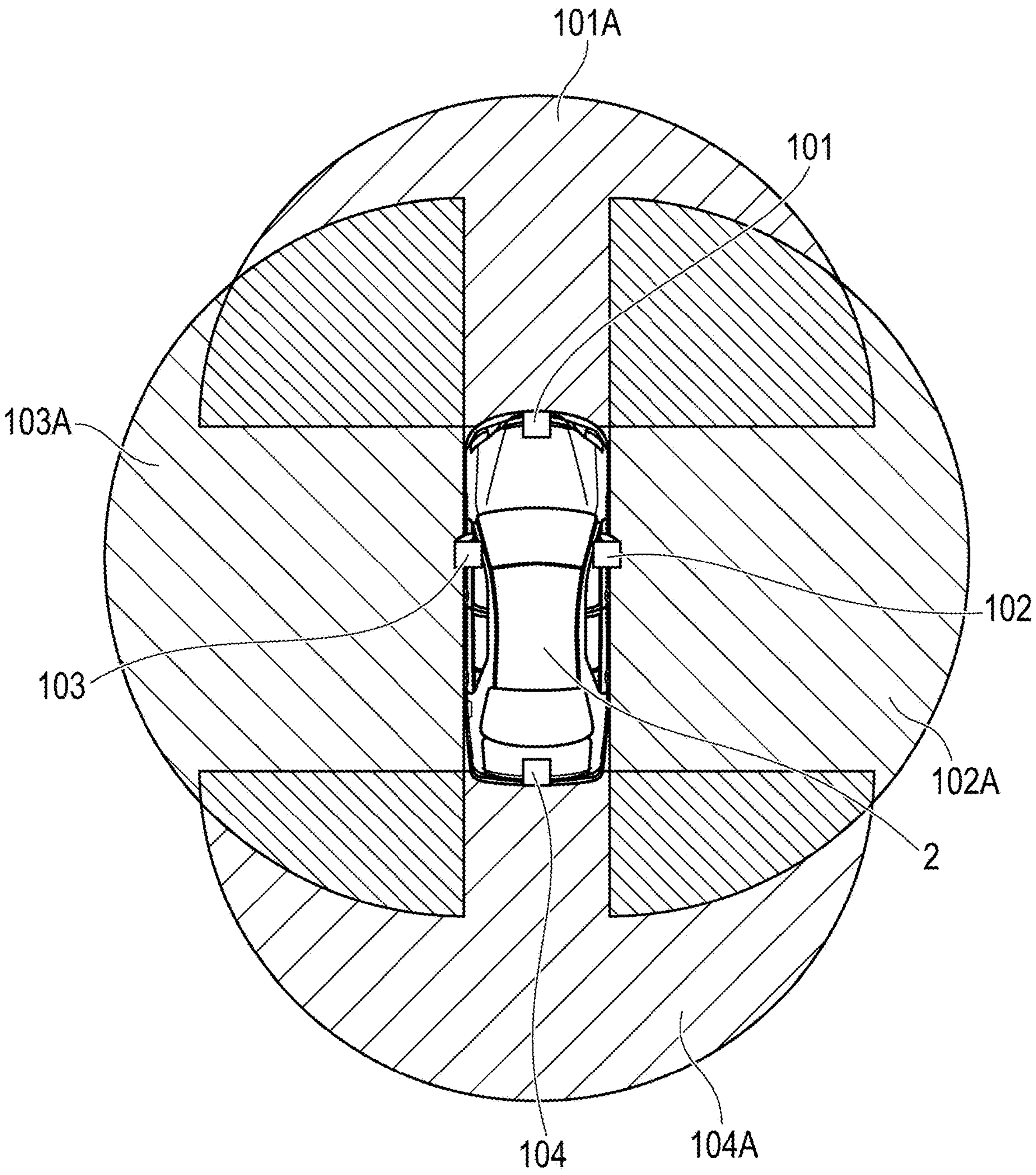
FIG. 2 is an example showing imaging areas of a plurality of cameras provided in a vehicle 2.

The cameras 10 are a camera group that images a periphery of the vehicle 2. The cameras 10 include, for example, a front camera 101, a right side camera 102, a left side camera 103, and a rear camera 104. FIG. 2 is an example showing imaging areas of a plurality of cameras provided in the vehicle 2. As shown in FIG. 2, the front camera 101 is provided on a front bumper or the like and images a front range 101A of the vehicle 2. The right side camera 102 is provided in a door mirror or the like and images a right side range 102A of the vehicle 2. The left side camera 103 is provided in a door mirror or the like and images a left side range 103A of the vehicle 2. The rear camera 104 is provided in a rear bumper or the like, and images a rear range 104A of the vehicle 2. Each of the cameras 10 outputs an image. The image includes a video and a still image.

The sensor 11 is a detector that detects an opened state of a door of the vehicle 2. The sensor 11 is, for example, a linear sensor that measures a door opening degree or a sensor that detects a state of a curtain switch. The door of the vehicle 2 is not limited to a door disposed at each seat, and may be a door of a trunk room, a door of a luggage room, a cover of an engine compartment, or the like. A type of the door of the vehicle 2 is not particularly limited. The door is not limited to a general door for getting on and off the vehicle in which a hinge is disposed vertically, and may be a door of a hatch type, a slide type, a double-hinged type, a gull-wing type, or the like.

The controller 12 has a function of supervising the image display device. The controller 12 is configured by an electronic control unit (ECU), for example. The ECU is an electronic control unit including a processor such as central processing unit (CPU), a storage device such as a ROM or a RAM, a communication device such as a controller area network (CAN) communication circuit, an input/output circuit, and the like. The controller 12 synthesizes images captured by the cameras 10 to generate an overhead image. The overhead image is an image in which the vehicle 2 is viewed from a viewpoint above the vehicle 2, and includes a video and a still image.

Figure 3:
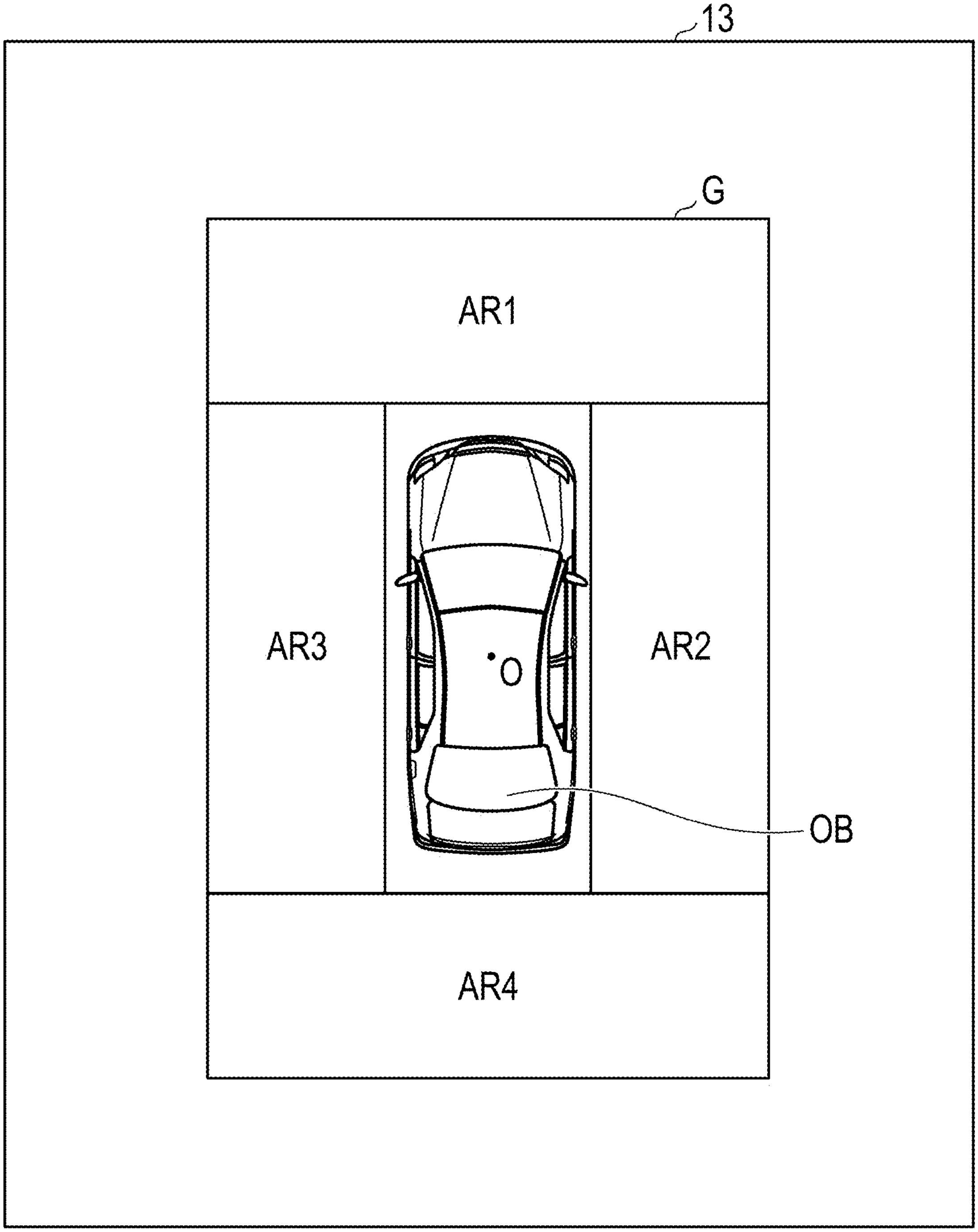
FIG. 3 is an example of an overhead image displayed on a display unit.

The display unit 13 displays the overhead image output by the controller 12. The display unit 13 is a display device as an example. FIG. 3 is an example of the overhead image displayed on a display unit. As shown in FIG. 3, the display unit 13 displays an overhead image G generated by the controller 12. The controller 12 generates the overhead image G including a vehicle object OB corresponding to the vehicle 2. The vehicle object OB is stored in the storage device of the ECU in advance. The controller 12 inputs image signals of the cameras 10 and performs image processing of generating an overhead image in which the vehicle 2 is viewed from a viewpoint in an upright direction. Viewpoint conversion is executed based on a disposition position and an imaging direction of each of the cameras 10 with the reference to a reference point O of the vehicle 2. The image processing for the viewpoint conversion may be executed by software or may be executed by a hardware circuit.

The controller 12 displays a front area AR1 of the vehicle 2 with the image signal captured by the front camera 101. The controller 12 displays a right side area AR2 of the vehicle 2 with the image signal captured by the right side camera 102. The controller 12 displays a left side area AR3 of the vehicle 2 with the image signal captured by the left side camera 103. The controller 12 displays a rear area AR4 of the vehicle 2 with the image signal captured by the rear camera 104. As a result, the overhead image G is generated.

Figure 4:
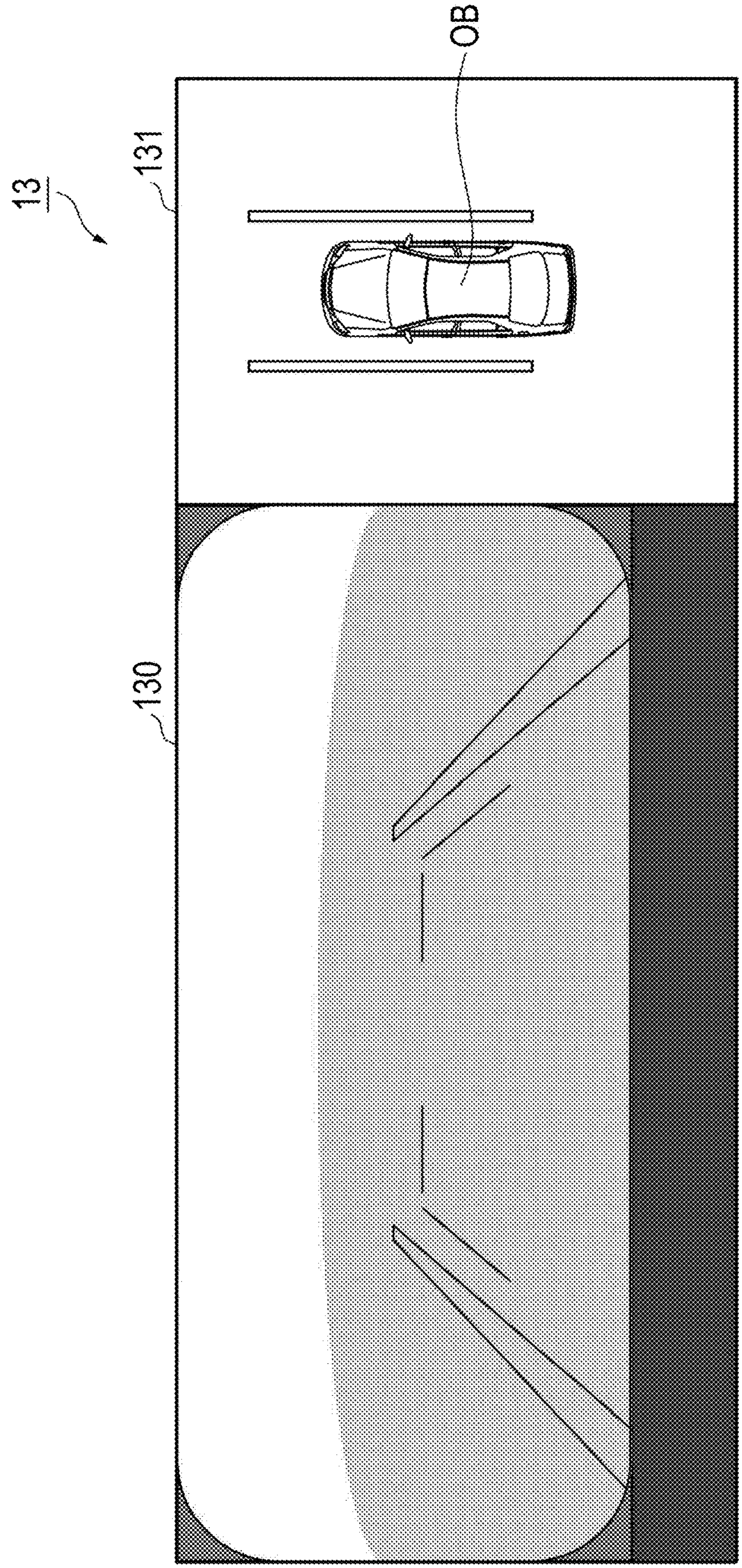
FIG. 4 is a diagram illustrating an example of the display unit including a display area for a camera image and a display area for the overhead image.

The controller 12 may display the overhead image on an entire screen of the display unit 13 as shown in FIG. 3, or may divide the screen of the display unit 13 and display the overhead image on some display area. FIG. 4 is a diagram illustrating an example of the display unit including a display area for a camera image and a display area for the overhead image. As shown in FIG. 4, the display unit 13 may have a first display area 130 and a second display area 131. The first display area 130 is an area in which the camera image is displayed. In the example of FIG. 4, the image of the front camera 101 is displayed, and a parking space partitioned by a white line is shown. The controller 12 may switch the camera image to be displayed in the first display area 130 according to a traveling direction. The second display area 131 is an area in which the overhead image shown in FIG. 3 is displayed. In the example of FIG. 4, a positional relationship between the vehicle and the parking space can be known at a glance by checking the overhead image. The controller 12 can appropriately notify an occupant of information on surroundings of the vehicle 2 by displaying images of surroundings of the vehicle 2 from various angles. The occupant is a person who gets on the vehicle, and includes a driver, a fellow passenger, and the like.

The controller 12 can enlarge the overhead image and display the overhead image on the display unit 13. As shown in FIG. 3, the basic overhead image before enlargement displays the entire vehicle object OB and includes images of the entire surroundings of the vehicle object OB. The enlargement of the overhead image means that a partial area included in the basic overhead image is selected, and an image of the selected area is resized to match a size of the display area of the overhead image (second display area 131 or the entire screen of the display unit 13).

The selection of the partial area is performed by the occupant. For example, the operation unit 14 shown in FIG. 1 receives an operation of the occupant. The operation unit 14 may be a switch or a button, or may be a touch panel. In a case where the operation unit 14 is configured by a touch panel, the operation unit 14 and the display unit 13 are integrally configured.

The operation of the occupant may be an operation of designating a predetermined partial area, such as an "upper area" or a "lower area". The predetermined partial areas may be, for example, two areas of the "upper area" and the "lower area" in which the screen is divided into two, or four areas of an "upper right area", an "upper left area", a "lower right area", and a "lower left area" in which the screen is divided into four. The designating operation may be an operation of selecting a presented partial area, or may be an operation of tapping or pinching out a part to be enlarged in the overhead image displayed on the touch panel with a finger. The operation unit 14 may be a device with which input can be performed via voice or gesture.

Figure 5A:
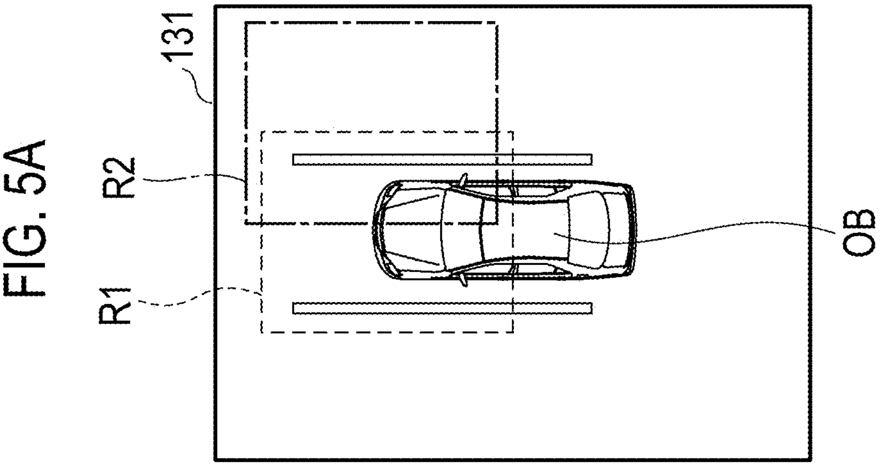
FIG. 5A is an example of the overhead image.
Figure 5B:
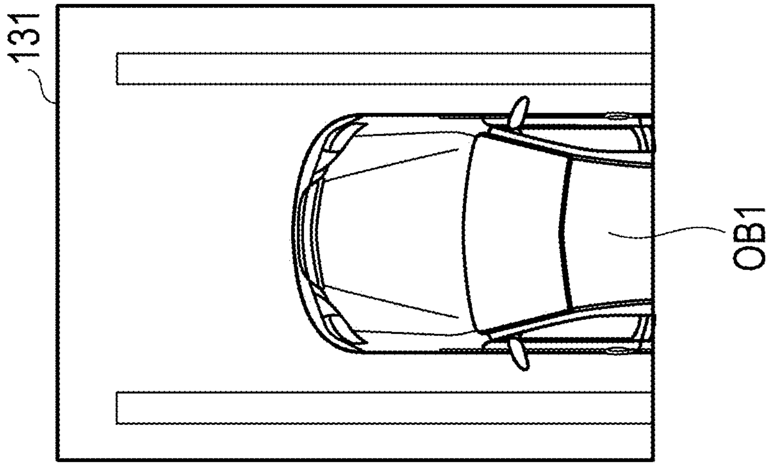
FIG. 5B is an example of the enlarged overhead image.

The controller 12 specifies an area to be enlarged based on the operation of the occupant received by the operation unit 14. The controller 12 enlarges the specified area and displays the area on the display unit 13. FIG. 5A is an example of the overhead image, FIG. 5B is an example of the enlarged overhead image, and FIG. 5C is another example of the enlarged overhead image.

As shown in FIG. 5A, it is assumed that the overhead image is displayed in the second display area 131. Then, in a case where the occupant selects the upper area of the vehicle as an area to be enlarged, the controller 12 enlarges a first area R1 in which a substantially upper half portion of the vehicle object OB is included in the overhead image shown in FIG. 5A to a size of the second display area 131 and displays the first area R1 in the second display area 131 (FIG. 5B). In this case, a vehicle object OB1 corresponding to the upper half portion of the vehicle object OB is displayed in the second display area 131.

Figure 5C:
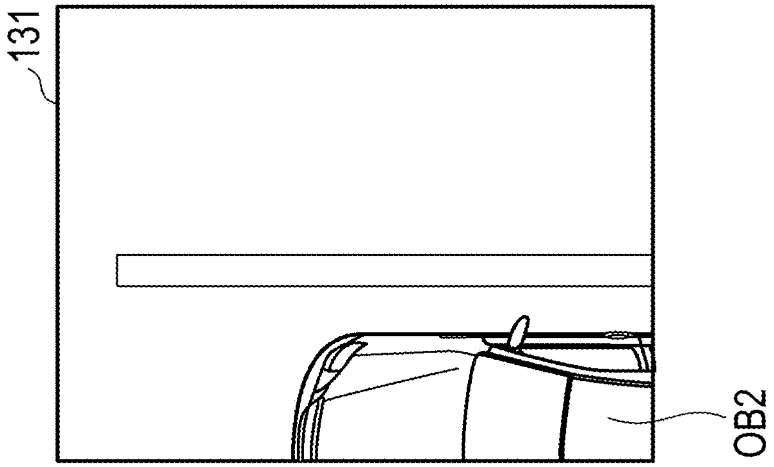
FIG. 5C is another example of the enlarged overhead image.

In addition, for example, in a case where the occupant selects the upper right area of the vehicle as an area to be enlarged, the controller 12 enlarges a second area R2 in which a substantially upper right portion of the vehicle object OB is included in the overhead image shown in FIG. 5A to the size of the second display area 131 and displays the second area R2 in the second display area 131 (FIG. 5C). In this case, a vehicle object OB2 corresponding to the upper right portion of the vehicle object OB is displayed in the second display area 131.

The controller 12 may cut out an area from the overhead image shown in FIG. 5A and enlarge a size of the cut-out image, or may enlarge the entire overhead image and display a portion corresponding to the area on the entire surface of the second display area 131. The controller 12 may generate the vehicle objects OB1, OB2 from the vehicle object OB, or may store the vehicle objects OB1, OB2 in the storage device of the ECU in advance.

Figure 6A:
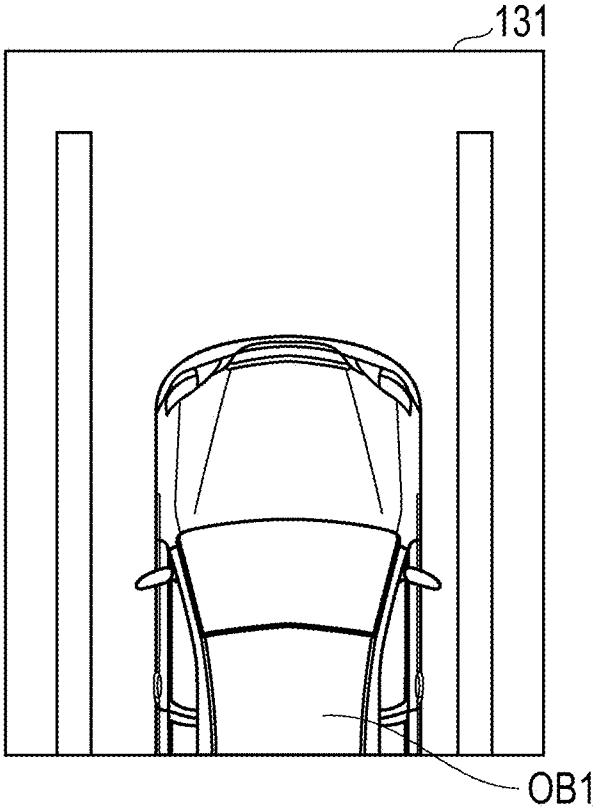
FIG. 6A is an example of the enlarged overhead image.
Figure 6B:
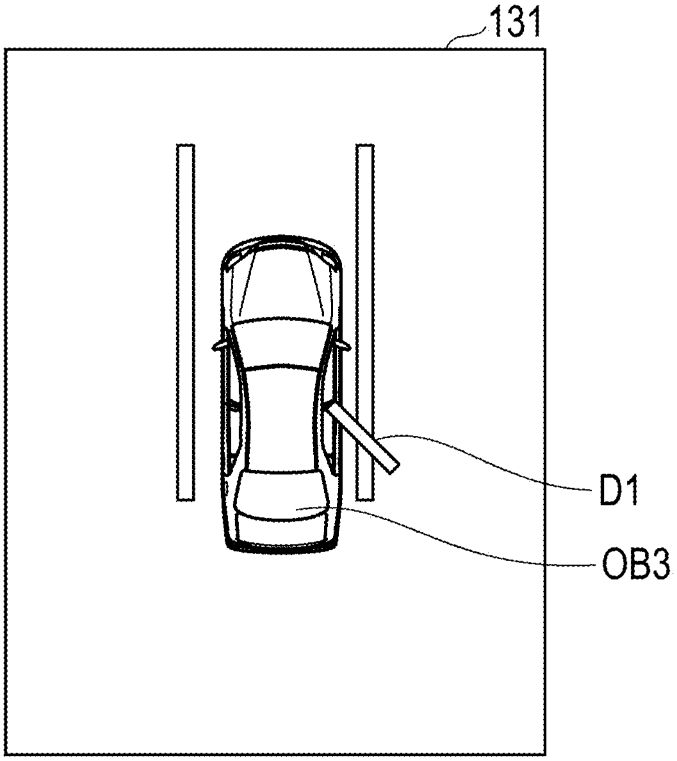
FIG. 6B is an example of the overhead image when enlargement of the overhead image is canceled in response to opening of a door.

The controller 12 cancels the enlargement of the overhead image in response to the detection of the opened state of the door of the vehicle 2 by the sensor 11. FIG. 6A is an example of the enlarged overhead image, and FIG. 6B is an example of the overhead image when the enlargement of the overhead image is cancelled in response to the opening of the door. As shown in FIG. 6A, the controller 12 enlarges the area in which the substantially upper half portion of the vehicle object OB is included in the overhead image to the size of the second display area 131, and displays the area in the second display area 131. In this state, it is assumed that the sensor 11 detects that a rear right door is opened. In this case, the controller 12 cancels the enlargement of the overhead image shown in FIG. 6A. When the enlargement of the overhead image is canceled, as shown in FIG. 6B, the basic overhead image is displayed in the second display area 131. The basic overhead image includes the entire vehicle object and an image of the entire surroundings of the vehicle object.

Here, the controller 12 may display a vehicle object OB3 for issuing an alert instead of the vehicle object OB shown in FIG. 3. The vehicle object OB3 includes a door object D1 indicating that the rear right door is opened. As a result, the controller 12 can issue an alert for a door-opened state on the overhead image. The vehicle object OB3 for issuing an alert is prepared in advance for each opened state of doors and is stored in the storage device of the ECU.

The controller 12 may not cancel the enlargement of the overhead image in a case where a condition under which no cancellation is required is satisfied when the sensor 11 detects the opened state of the door of the vehicle 2. The condition under which no cancellation is required is that all doors of which opened states are detected by the sensor 11 are within the overhead image in an enlarged state displayed on the display unit 13.

The controller 12 stores information on the enlarged area in the storage device of the ECU when the overhead image is enlarged. The information on the enlarged area is information with which it is possible to specify a door position included in the enlarged overhead image. The controller 12 specifies the door position in the opened state based on a detection signal of the sensor 11 when the sensor 11 detects the opened state of the door of the vehicle 2. Then, the controller 12 determines whether or not all the doors in the opened state are within the overhead image based on the specified door position and the information on the enlarged area. That is, determination is made as to whether or not the alert for the door in the opened state can be displayed in the enlarged overhead image.

For example, in the enlarged overhead image shown in FIG. 6A, a front door of the vehicle is displayed, and thus the door object indicating the opened state can be superimposed on the front door of the vehicle. Therefore, even when the sensor 11 detects the opened state of the front door of the vehicle 2, the controller 12 does not cancel the enlargement of the overhead image. As described above, by providing the condition under which no cancellation is required, unnecessary cancellation of the enlargement of the overhead image is avoided. On the other hand, in a case where the sensor 11 detects the opened state of a rear door of the vehicle 2, the door object indicating the opened state cannot be superimposed since the rear of the vehicle is not depicted in the vehicle object OB1. Therefore, the controller 12 cancels the enlargement of the overhead image when the sensor 11 detects the opened state of the rear door of the vehicle 2. As described above, when the condition under which no cancellation is required is not satisfied, the enlargement of the overhead image is cancelled.

The controller 12 may emphasize the door object D1. For example, the controller 12 may change a color of the door object D1. The controller 12 may synthesize the door reflected in the camera image as an actual image by performing the viewpoint conversion on the door, instead of synthesizing the door as the object. In this case, since the controller 12 does not need to store the vehicle object OB3 for issuing the alert in advance, calculation costs can be reduced.

Functioning of Image Display Device (Image Display Method)

Figure 7:
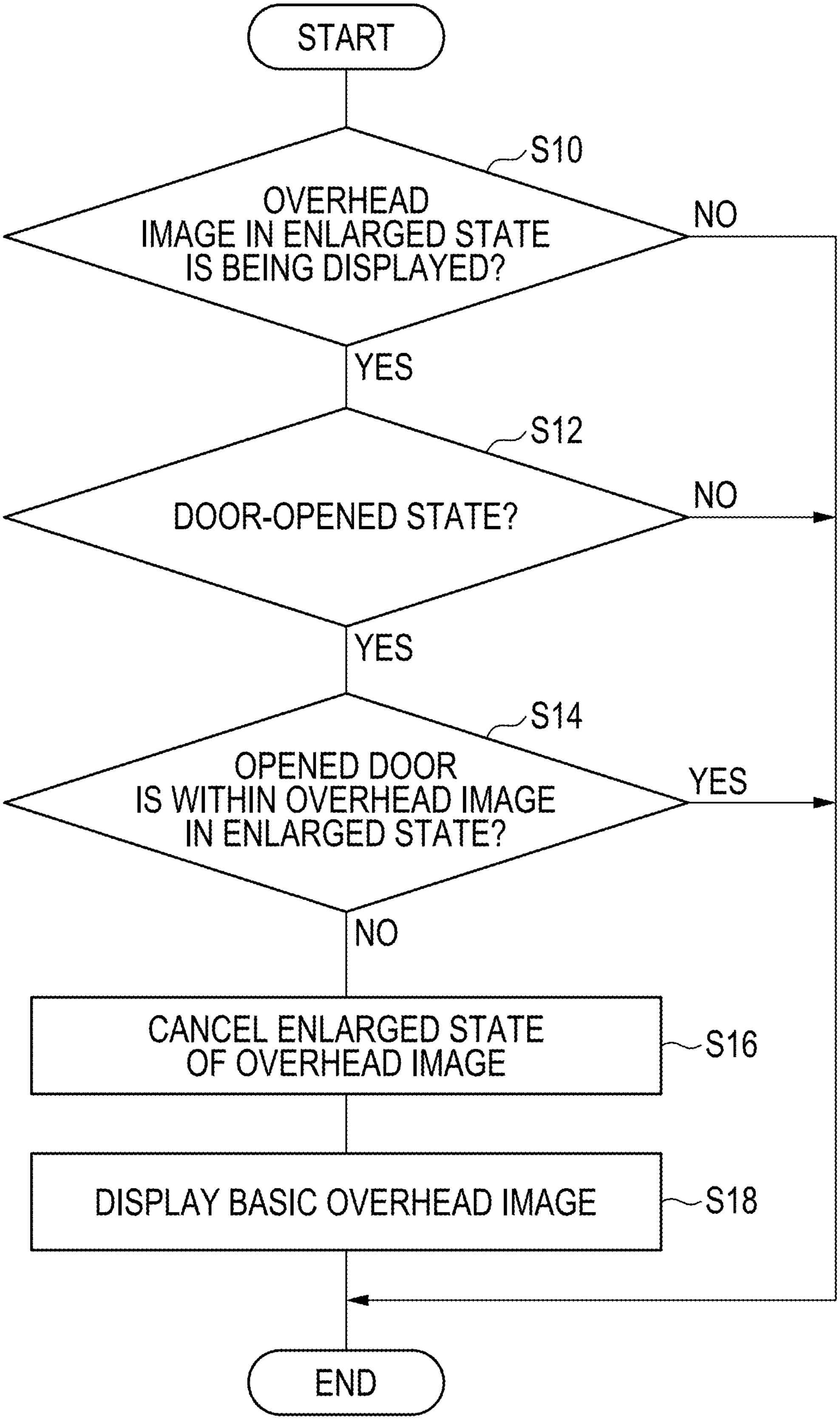
FIG. 7 is a flowchart showing functioning of the image display device.

FIG. 7 is a flowchart showing functioning of the image display device. The flowchart shown in FIG. 7 is executed by the controller 12, for example, at a timing when the operation of the occupant is received.

As shown in FIG. 7, in step S10, the controller 12 determines whether or not the overhead image in the enlarged state is being displayed. The controller 12 determines that the overhead image in the enlarged state is being displayed in a case where the overhead image is enlarged and is being displayed based on the operation of the occupant received by the operation unit 14 (for example, refer to FIG. 6A).

When determination is made that the overhead image in the enlarged state is being displayed (step S10: YES), in step S12, the controller 12 determines whether or not the door is in the opened state. The controller 12 determines whether or not the door is in the opened state based on a detection result of the sensor 11.

When determination is made that the door is in the opened state (step S12: YES), in step S14, the controller 12 determines whether or not the opened door is within the overhead image in the enlarged state. The controller 12 specifies the door position in the opened state based on the detection signal of the sensor 11 when the sensor 11 detects the opened state of the door of the vehicle 2. Then, the controller 12 determines that the opened door is within the overhead image in the enlarged state in a case where all the doors in the opened state are in depictable door positions, based on the specified door position and the door positions depictable within the overhead image in the enlarged state. In the example shown in FIG. 6A, in a case where the front door of the vehicle is in an opened state, the controller determines that the opened door is within the overhead image in the enlarged state. The controller 12 determines that the opened door is not within the overhead image in the enlarged state in a case where at least one door in the opened state is not in the depictable door positions, based on the specified door position and the door positions depictable within the overhead image in the enlarged state. In the example shown in FIG. 6A, in a case where the rear door of the vehicle is in the opened state, the controller determines that the opened door is not within the overhead image in the enlarged state.

When determination is made that the opened door is not within the overhead image in the enlarged state (step S14: NO), in step S16, the controller 12 cancels the enlargement of the overhead image. As a result, in step S18, the controller 12 displays the basic overhead image (for example, refer to FIG. 6B). Since the basic overhead image includes the entire vehicle object and the image of the entire surroundings of the vehicle object, the opened door is included in the overhead image. In this case, the controller 12 may display the vehicle object OB3 for issuing an alert according to the opened state of the door, or may display the overhead image obtained by synthesizing the door reflected in the camera image as the actual image by performing the viewpoint conversion on the door. As a result, an alert for the door in the opened state is issued on the overhead image.

When determination is made that the overhead image in the enlarged state is not being displayed (step S10: NO), determination is made that the door is not in the opened state (step S12: NO), determination is made that the opened door is within the overhead image in the enlarged state (step S14: YES), or when step S18 is ended, the flowchart is ended. The flowchart is repeatedly executed from the beginning until a driver operation of ending is received.

Summary of Embodiment

With the image display device 1, the images captured by the cameras 10 that capture the periphery of the vehicle 2 are synthesized, and the overhead image is displayed on the display unit 13. The overhead image is enlarged and displayed on the display unit 13. The enlargement of the overhead image is canceled in response to the detection of the opened state of the door of the vehicle 2 by the sensor 11. By canceling the enlarged state, the overhead image in which the entire vehicle is viewed from above is displayed on the display unit 13, and thus the image display device 1 can issue the alert for the door in the opened state on the overhead image. As described above, the image display device 1 can appropriately achieve both the convenience of the image enlargement and the alert for the door-opened state by canceling the enlargement display when the door is in the opened state while the enlargement display is allowed.

With the image display device 1, In a case where all the doors in the opened states are within the overhead image, the enlargement of the overhead image is maintained, and thus the unnecessary cancellation of the enlargement of the overhead image is avoided. Therefore, the image display device 1 can more appropriately achieve both the convenience of the image enlargement and the alert for the door-opened state.

Although the exemplary embodiment has been described above, various omissions, substitutions, and changes may be made without being limited to the exemplary embodiment.

For example, the controller 12 may generate the overhead image with solely a single camera under a condition that the vehicle 2 moves. The controller 12 stores camera images in the storage device of the ECU while the vehicle 2 is moving, and generates an overhead image by using a past image and a real-time image obtained by the vehicle 2 moving. The enlargement display can be performed also for the overhead image generated with the single camera. Therefore, the image display device 1 can appropriately achieve both the convenience of the image enlargement and the alert for the door-opened state, regardless of the number of cameras.

The image display device 1 performs the enlargement display of the overhead image based on the operation of the occupant received by the operation unit 14, but may perform the enlargement display of the overhead image based on information other than the operation of the occupant. For example, the image display device 1 may include an external sensor, such as radar, and when an object, such as a moving object or an obstacle, is detected, enlargement display of an area in which the detected object is positioned may be performed. Therefore, the image display device 1 can appropriately achieve both the convenience of the image enlargement and the alert for the door-opened state, regardless of presence or absence of the operation unit 14.

What is claimed is:

1. An image display device comprising:

a camera configured to image a periphery of a vehicle;

a controller configured to output an overhead image in which the vehicle is viewed from a viewpoint above the vehicle, the overhead image being obtained by synthesizing images captured by the camera;

a display unit configured to display the overhead image output by the controller; and a sensor configured to detect an opened state of a door of the vehicle, wherein the controller is configured to:

enlarge the overhead image and display the overhead image on the display unit, determine whether or not the door of which the opened state is detected by the sensor is within the overhead image in an enlarged state displayed on the display unit, not cancel the enlargement of the overhead image in response to the determination that the door in the opened state is within the overhead image, and cancel the enlargement of the overhead image in response to the determination that the door in the opened state is not within the overhead image.

2. An image display method comprising:

synthesizing images captured by a camera configured to image a periphery of a vehicle to generate an overhead image in which the vehicle is viewed from a viewpoint above the vehicle;

enlarging the generated overhead image and displaying the overhead image on a display unit;

detecting an opened state of a door of the vehicle;

determining whether or not the door of which the opened state is detected is within the overhead image in an enlarged state displayed on the display unit, not canceling the enlargement of the overhead image in response to the determination that the door in the opened state is within the overhead image; and canceling the enlargement of the overhead image in response to the determination that the door in the opened state is not within the overhead image.

* * * * *